United States Patent [19]

McGuire, Jr. et al.

[11] Patent Number: 4,475,028

[45] Date of Patent: Oct. 2, 1984

[54] MULTI-MODE CONSTANT POTENTIAL PULSED WELDING APPARATUS

[75] Inventors: William L. McGuire, Jr., Newport News; Gerald E. Paxton; Dougals M. Wheeler, both of Hampton, all of Va.

[73] Assignee: Newport News Shipbuilding & Dry Dock Co., Newport News, Va.

[21] Appl. No.: 465,615

[22] Filed: Feb. 10, 1983

[51] Int. Cl.³ .............................................. B23K 9/09
[52] U.S. Cl. ......................... 219/130.51; 219/137 PS
[58] Field of Search .......... 219/130.51, 130.5, 137 PS

[56] References Cited

U.S. PATENT DOCUMENTS

| | | | |
|---|---|---|---|
| 3,361,892 | 1/1968 | Spencer | 219/130.51 |
| 3,538,301 | 11/1970 | Bray et al. | 219/137 PS |
| 3,588,465 | 6/1971 | Anderson et al. | 219/130.51 |
| 4,301,355 | 11/1981 | Kimbrough et al. | 219/137 PS |
| 4,384,188 | 5/1983 | Wright, Jr. | 219/130.5 |

FOREIGN PATENT DOCUMENTS

| | | | |
|---|---|---|---|
| 50-24895 | 8/1975 | Japan | 219/130.51 |
| 55-133874 | 10/1980 | Japan | 219/130.51 |

*Primary Examiner*—C. C. Shaw
*Attorney, Agent, or Firm*—Lalos, Leeds, Keegan, Lett, Marsh, Bentzen & Kaye

[57] ABSTRACT

A multi-purpose welding power supply to provide different modes of welding from a single unit. Two positive output terminals are provided, one for low amperage welding up to about 300 amp which includes an inductor and slope resistor and one for high amperage output up to about 600 amp which bypasses the inductor and slope resistor in the low amperage circuit. A pulsing circuit is provided to impose on the 300 amp output either 60 pps or 120 pps pulses on a standard direct current background. A variable pulse width control circuit is integrated with the pulsing circuit to vary the pulse width. A "hot start" feature is included with the 60 pps welding mode to provide 120 pps pulses for an initial pre-selected time period.

13 Claims, 4 Drawing Figures

MULTI-MODE CONSTANT POTENTIAL PULSED WELDING APPARATUS

BACKGROUND AND DISCUSSION OF THE INVENTION

The invention generally relates to multi-purpose welding power supplies for providing different modes of welding capability from a single unit. In addition, there are certain features which enable or enhance the use of a particular mode independently of the others comprising the multi-purpose feature in the welding power supply.

In many welding operations it may be necessary to have the ability to weld utilizing more than one mode of operation. For example, in high speed sheet metal work with consumable electrodes direct current welding is preferred, while in welding softer metals such as aluminum with non-consumable electrodes, alternating is preferred. In the latter instance a constant potential direct current would cause either the work product or the electrode to become excessively hot. An example of such a system is disclosed in the U.S. Pat. No. 2,757,296 to Bishel issued July 31, 1956. Although alternating current and direct current capability have been provided before a single unit, these systems have been characterized at least in part by inefficiencies and complexities which detract from their use in multi-purpose welding units.

Another type of welding known as pulse arc welding, where an axial spray from a consumable electrode occurs at a high current density, has a number of advantages over constant potential or alternating current systems discussed above. Advantages of axial spray pulse arc welding include better direction control in several planes without affecting arc behavior, enhanced penetration due to the concentration of energy of the arc, and the kinetic energy of the metal drop striking the weld pool to produce deep weld penetration. However, in out-of-position welding, the high fluid densities of spray pulse arc welding may be too fluid to control. One approach suggested in overcoming this problem is disclosed in U.S. Pat. No. 3,071,680 to Anderson issued Jan. 1, 1963. Anderson in this patent states that welding current should be supplied in discrete pulses against a background of "keep alive current" which is sufficient to maintain the arc without causing the transfer of metal to the workpiece. This is accomplished by producing current pulses which terminate before a globule of molten metal can form during successive spray producing current pulses. The circuit employed to limit this pulse arc time is excessively complex, employing a number of tubes and inductors rendering the device one which lacks accuracy and is excessively power consumptive as well.

The invention described herein overcomes many of the limitations of multi-purpose power sources for welding discussed above. A single unit comprises circuitry to provide for five different welding modes from a three phase alternating current source through a three (3) stage transformer system to two positive output terminals. The first mode is a standard constant potential welding mode with short arc capability up to 300 amps with fixed slope resistor and variable inductor at the first output terminal. The second mode is a standard constant potential operation for high quality cored wire and mig spray arc welding up to 600 amperes at the second output terminal. The circuitry for the 600 ampere mode bypasses the inductor and slope resistor and utilizes only the slope resistance inherent in the three stage transformer system. The third mode provides pulse arc capability at 60 pulses per second (pps) with a "hot start" feature; the fourth mode also provides pulse arc capability at 60 pps but without "hot start"; and the fifth mode provides pulse arc capability at 120 pps.

The pulses for the third, fourth, and fifth modes are generated with a constant voltage transformer and subjected to half wave rectification to provide sixty (60) pulses of direct current per second or to a full wave bridge rectifier to provide 120 pulses per second. A hot start feature utilized with the 60 pulses per second (pps) pulse welding mode is accomplished by energizing the 120 pps pulse arc mode for a relatively short period of time after which the "hot start" circuitry becomes disconnected from the remainder of the system. This "hot start" is required with 60 pps pulse arc welding to facilitate initiating the arc at lower current levels such as those in the 60 pps mode.

The invention includes a variable pulse width control mechanism to control pulse width for either the 60 pps or 120 pps welding. By properly controlling the pulse width by phase control silicon-controlled rectifiers and a special transformer, a pulse rate can be employed with a sufficient time lapse between the pulses to allow the welding electrode to operate at the proper temperature. The system is particularly adapted for out-of-position welding at a pulse rate of 120 pps.

A feature of the invention includes the ability to perform pulse arc welding at 60 pps, or 120 pps, and standard constant potential welding in a single machine. Other sub-systems which comprise these features noted above are also unique as will be described in detail hereinafter.

DETAILED DESCRIPTION OF THE PREFERRED EMBODIMENT

Figure 1:
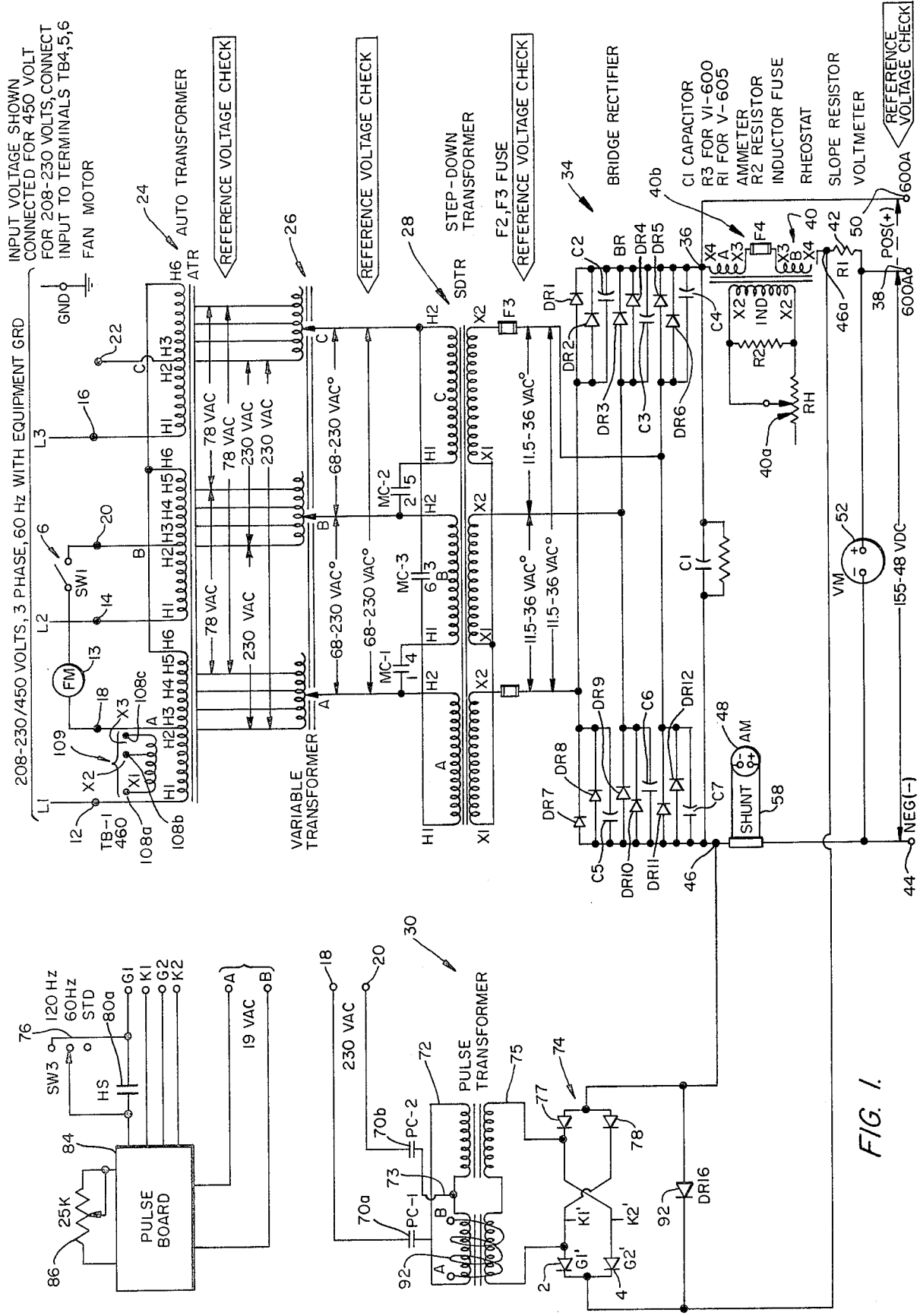
FIG. 1 is a circuit diagram of the electrical system employed in the invention.

As can be seen in FIG. 1, the system is designed for operation with three phase alternating current input of either 460 volts or 208–230 volts. This input is connected to an auto transformer 24 for reducing the voltage and increasing current in the secondary coils. A fan 13 is connected to the input terminals to provide cooling for the elements of the system. Auto transformer 24 is in turn connected to a variable transformer 26 for varying the voltage delivered ultimately to step down transformer 28. A main contactor 32 is arranged between variable transformer 26 and the step down transformer 28 for energizing the step down transformer 28 and ultimately energizing the output.

In series with main contactor 32, and step down transformer 28 is main bridge rectifier 34 for rectifying the alternating current supplied by transformer 28 ultimately to the welding electrode and work piece. In series with the main bridge rectifier 34 is a variable inductor 40 and a slope resistor 42 for controlling the current characteristic delivered to the output terminals 38, 44. Parallel to the variable inductor 40 and slope resistor 42 between rectifier 34 and negative output terminal 44 are shunt 58 and ammeter 48 for measuring the current delivered. Voltmeter 52 is connected across terminals 44 and 38 for measuring the voltage delivered to the output. Also provided in parallel with the inductor 40 and slope register 42 is a 600 amp outlet 50 which completely bypasses variable inductor 40 and slope resistor 42 and provides a constant voltage 600 amp source without the need for an inductance which would otherwise be required in low current welding.

Pulse contactor 70 is connected to main contactor 32 and auto transformer 24 to be energized when the main contactor 32 is activated. Connected in series with pulse contactor 70 is the pulse transformer 72 which provides the voltage needed to the pulse bridge 74 and also provides by means of auxiliary winding 92 a source of power for pulse board 84. Pulse bridge 74 is connected across the outlets of the machine to provide pulses against the background current provided by the three phase input and the other elements shown in FIG. 1.

Figure 2:
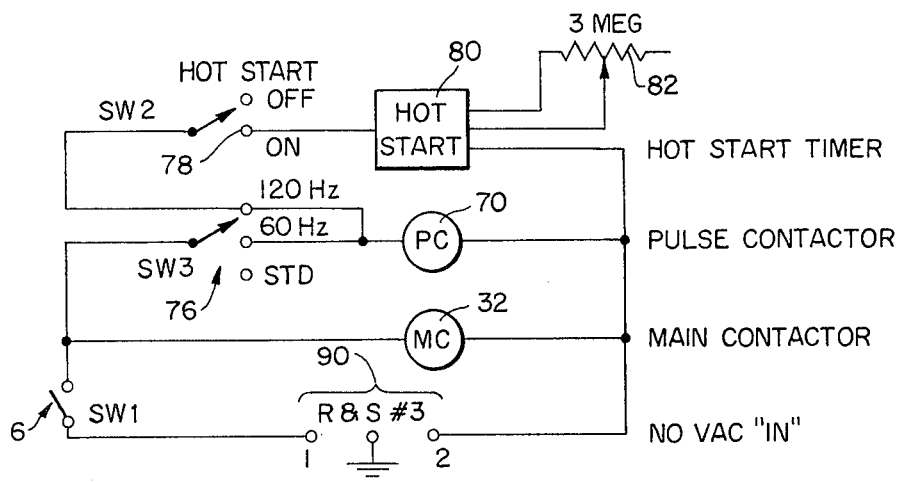
FIGS. 2a and 2b are circuit diagrams of the control system for the welding apparatus of the invention.

As can be seen in FIGS. 1 and 2 three pole switch 76 with potentiometer 86 is integrated with main contactor 32, pulse contactor 70, and pulse board 84 to enable selection of a particular welding mode. Pulse board 84 is also connected to "hot start" control 80 with potentiometer 82 via switch 78 to provide "hot start" capability during 60 pps pulse arc welding.

The above has been a general description of various elements of the invention. More detailed circuitry for accomplishing the desired pulsing combination with the other features or modes of operation is shown in detail in FIG. 1. The circuitry shown in the center portion of FIG. 1 is a known circuit for providing a constant potential with a 300 amp or a 600 amp output to the welding electrode. Auto transformer 24 has three terminals 12, 14, and 16, as well as ground for connection to a three phase 460 volt source and alternate terminals 18, 20, and 22 for connections to 208-230 volt source. Variable transformer 26 is connected with the auto transformer 24 to select the voltage required in a particular welding operation. The variable transformer can be varied between voltages of 68 to 230 volts AC and is driven by motor 25 (shown in FIG. 2A).

Each phase of variable voltage transformer 26 is connected to a step down transformer 28 through three contacts 32a, 32b, and 32c on main contactor 32 as shown. Each one of these phases is again connected to a bridge rectifier 34 which rectifies the alternating current to provide the direct current to the outlet terminals 38, 44, and 50. It should be noted that two terminals are provided to render two different modes of operation. One terminal 38 is for 300 amp operation and is connected in series with a variable inductor 40 and a slope register 42. The other terminal 50 is a 600 amp output which bypasses inductor 40 and slope resistor 42. In those cases where inductance is required, the resistance on the primary coil of inductor 40 is varied by rheostat 40a to control the amount of inductance in the secondary coils. This control allows the operator to control the current characteristic in the 300 amp welding mode. This enhances the welding characteristics in the 300 amp mode when used for short arc or pulse welding operation. This circuit also incorporates a fuse 40b to protect the inductor if the current is inadvertently raised beyond the 300 amp limit.

The system for producing constant potential welding described in the preceding has been known heretofore. The following discussion of certain elements integrated in this system relates to improvements which permit the system to be used for pulse arc welding at either 60 or 120 pps, with means for controlling the pulse width.

To permit the above system to be used as a pulsing unit for certain types of welding, pulse transformer 72 in conjunction with a pulse bridge 74 is incorporated with the circuitry across the output terminals 38 and 44 at 46 and 46a to impose a pulse against a background current provided by the constant potential welding circuitry discussed above. For this purpose, the pulse transformer 72 is connected to a 220 volt alternating current source from the auto transformer at terminals 18 and 20. The connections are made, as can be seen in FIGS. 1 and 2, through contacts 70a and 70b of pulse contactor 70. In this way, when integrated with pulse bridge 74, either 60 pps or 120 pps controlled pulses can be delivered to the output terminals 38 and 44 against the background current. The secondary coils of pulse transformer 72 are connected to the pulse bridge 74 having on one side diodes 77 and 78 and on the other side silicon controlled rectifiers 2 and 4 with free-wheeling diode 92 across this bridge. These rectifiers are connected in turn to pulse board 84 which is activated by a series of switches to control the pulse width and determine the frequency—60 or 120 pps—in which the pulse system will operate. A more detailed discussion of selecting these modes and operation of the pulse circuitry will be described hereinafter.

Referring to FIG. 1 pulse board 84 is a circuit for providing triggering pulses to SCR's 2 and 4 in pulse bridge 74. Pulse board 84 is an item which is known in the art, sold for example by the M. T. Gilliland Co., Part No. FI-SS-6-17. Pulse board 84 receives a low volage—about 20 VAC 60 hz-signal from auxiliary winding 92 on pulse transformer 72 and shapes this signal to provide triggering pulses to pulse bridge 74 at connections G1, K1, G2, and K2.

Switch 76 is used to select either the standard, 60 pps pulse arc or 120 pps pulse arc welding modes. In the standard position, the pulse circuit is not activated, because pulse contactor 70 is not activated. With switch 76 in the 60 pps position, triggering pulses from pulse board 84 are provided to the gate G2 of SCR 4 only. With only SCR 4 triggered, pulse bridge 74 provides 60 pps of direct current across the output at 46 and 46a.

When switch 76 is in the 120 pps position, triggering pulses are provided to the gates G1 and G2 of both SCR's 2 and 4. With both SCR 2 and SCR 4 triggered, pulse bridge 74 provides 120 pulses per second of direct current across the output.

Figure 3:
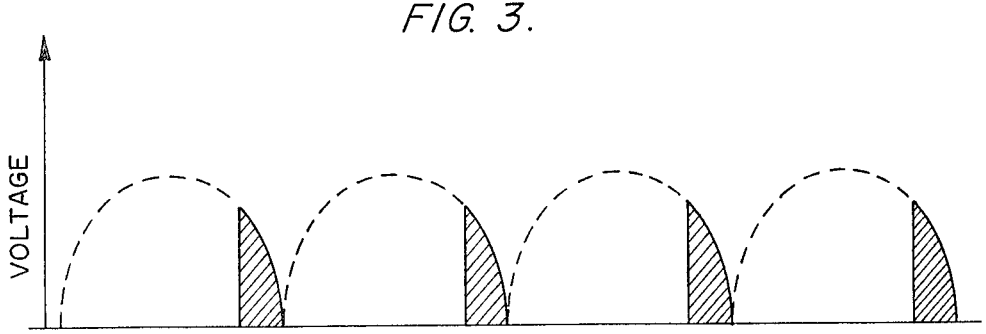
FIG. 3 is an example of a wave shape that can be used with the invention.

In certain situations using the 120 pps pulse arc mode, some difficulty may be encountered, for example, in out-of-position welding. This may be attributed to the welding electrode having insufficient time to form molten droplets of the right size and shape between pulses. In our invention, this is remedied by controlling the width of the pulses. This is accomplished by pulse board 84; the point of the input sine wave at which the SCR's 2 and 4 are triggered is varied by means of potentiometer 86. In FIG. 3, the dashed lines represent the output of pulse bridge 74 in the 120 pps pulse mode without pulse width control. The shaded portion represents the output of the pulse bridge when potentiometer 86 has been set to select only that portion of the pulse. The effect is to provide time between pulses for molten droplets of the right shape and size to form. The effect is also to reduce the voltage of the output as measured by voltmeter 52. In practice, the operator adjusts potentiometer 86 to obtain a desired pulse voltage.

It should be noted at this point that the pulse width control feature also operates in the 60 pps pulse mode in a manner similar to that in the 120 pps mode. The output of the pulse bridge 74 in this mode could be represented by FIG. 3 as well, but with every other pulse deleted.

In welding in the 60 pps pulse arc mode at lower welding current levels, some difficulty is occasionally experienced in initiating the arc. In our welding power supply, a "hot start" capability is included to facilitate initiation of the arc. Referring to FIGS. 1 and 2, where a "hot start" is desired, the switch 76 remains in the 60 pps mode and switch 78 is closed to incorporate a "hot start" timer 80 whose time is controlled by variable resistor 82. As can be seen from the drawing, "hot start" timer 80 and its corresponding switch is also arranged parallel with the pulse contactor 70. Consequently, when switch 78 is in the "on" position and switch 76 is in the 60 pps mode, the "hot start" timer will operate to close the "hot start" contactor 80a to the G1 terminal thereby activating both SCR's 2 and 4 to obtain the 120 pps operation. However, the timer will de-energize after a selected period of time, normally about 0.3–3 seconds, and revert to the 60 pps operation.

A special pulse transformer 72 achieves unique results particularly in a welding environment. As can be seen in FIG. 1 the 230 vac power source for the pulse transformer 72 is obtained by connecting the primary coils 73 of the pulse transformer 72 to two phases of the auto transformer 24. It should be noted that primary coils 73 are connected in parallel while the secondary coils 75 connected to pulse bridge 74 are in series. Pulse transformer 72 is wound such that the output of the secondary series-connected coils is about 57.5 VAC. Primary coils 73 are separated from auto transformer 24 by pulse contactor 70 as described above. Therefore, pulse transformer 72 and pulse bridge 74 are not placed into operation until pulse contactor 70 is energized. When contactor 70 is energized and the desired pulse operation is selected, pulse transformer 72 in conjunction with the pulse bridge 74 and pulse board 84 operate to superimpose pulses on the constant potential background output as described above.

Figure 2A:
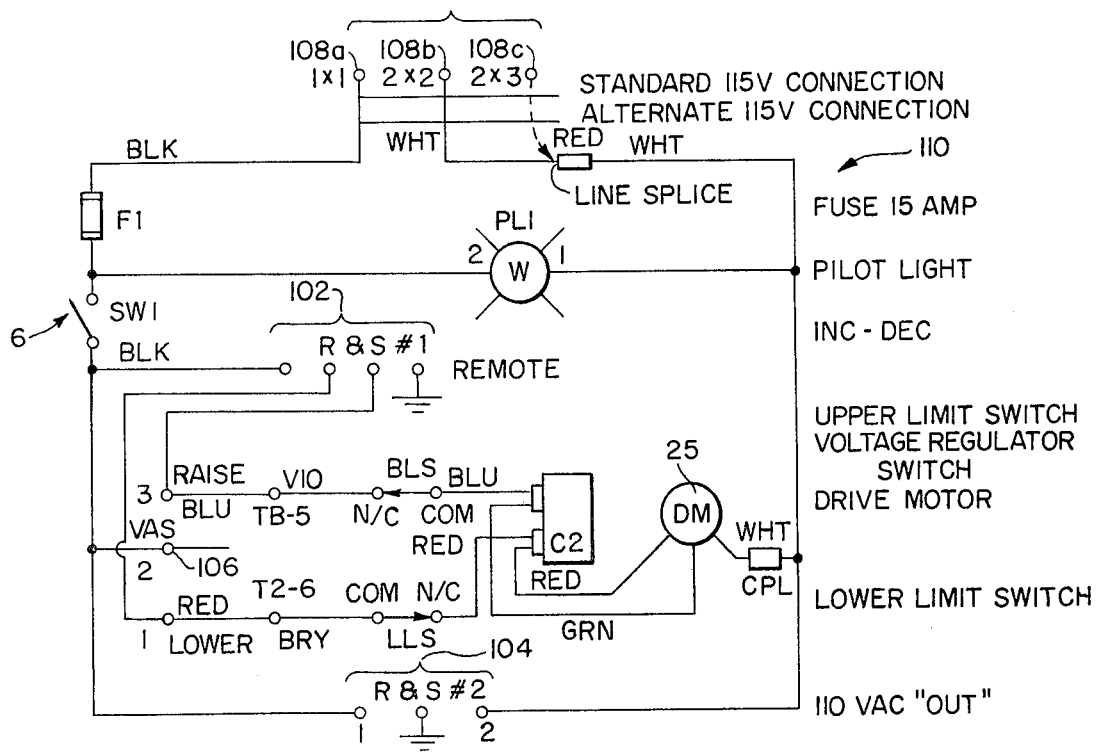

The control system for selecting and operating the various modes of the welding machine will be described in conjunction with FIGS. 2 and 2a, which show a portion of the control circuit for operating various elements of the system. Control circuit 110 receives its 110 v power at terminals 108a and 108b of auxiliary winding 109 which is a secondary winding of auto transformer 24. A remote control unit not shown can be connected to circuit 110 through terminals 102, 104, and 106. To adjust variable transformer 24 from a remote location, terminals 102 provide a connection to motor 25 to drive variable transformer 26 by raising or lowering brushes A, B, C of transformer 26 with respect to auto transformer 24. Voltage regulator switch 106 connected in parallel with terminals 102 controls the direction of motor drive for this purpose from the main unit. Terminals 104 provide 110 VAC out to remote control unit for providing power to a wire feeder at the welding station. The 110 VAC feed to the remote control unit returns at terminals 90 to provide control voltage for the main contactor 32, pulse contactor 70, and the "hot start" timer 80.

It can be seen that the main contactor 32 controlling the connection between variable transformer 26 and step down transformer 28 is in parallel with the voltage input at 90. A switch 6 is provided between main contactor 32 and input 90 is referred to as a "ready" or "on" switch. This controls the fan motor 13, 110 volt auxiliary power to the remote control unit through terminals 102, 104, and 106 as well as the main contactor which ultimately connects the variable transformer to the remainder of the circuit. Pulse contactor 70 is connected in parallel with the main contactor 32 by a three pole selector switch 76 for selecting three modes of operation, standard, 60 pps pulse arc, and 120 pps pulse arc, as explained above. Switch 78 is used to select the "hot start" mode during 60 pps pulse arc welding as explained previously.

In operation the "ready" or "on" switch 6 is placed in the "on" position; this energizes the fan motor and 110 volt auxiliary power to the remote control unit. If standard constant potential mode is selected the welding voltage is then set to the desired level using voltage regulator switch 106. This drives the motor 25 which in turn moves the brushes A, B, and C along the variable transformer 26 until the selected voltage is reached. If the welding electrode is connected to the 300 amp outlet, the variable inductor is selected to provide the desired amount of inductance. If the 600 amp welding is being achieved, the welding cables are connected to the circuit by-passing the inductor; and therefore operation of the variable inductor is not required.

If the pulse arc welding is desired, the pulse contactor switch selects the type of pulsing desired whether it be 60 pps with or without "hot start" or 120 pps. The variable pulse wave control 86 must be adjusted to achieve the desired time span between pulses and the desired pulse voltage.

I claim:
1. A welding apparatus powered from a conventional AC source comprising:
   a. rectifier means for converting AC current to standard rectified DC current at a substantially constant potential;
   b. terminal means connected to said rectifier means for connection to welding cables and for delivering rectified DC current at said substantially constant potential and at a first current level;
   c. means for providing direct current pulses at a substantially constant frequency in a number of pulses per second to said terminal means superimposed on said standard rectified DC current at said first current level;
   d. said terminal means also being connected to said rectifier means for connection to welding cables and for delivering rectified DC current at a substantially constant potential and a second current level higher than that of said first current level;
   e. means for controlling the width of the pulse provided at said terminal means;
   f. selecting means for selecting one of said first current level and said second current level delivered to said terminal means and for selecting means for providing direct current pulses at said terminal means to provide at least three modes of welding.

2. The apparatus according to claim 1 wherein, the first current level is about 300 amperes.

3. The apparatus according to claim 1 wherein, the second current level is about 600 amperes.

4. The apparatus according to claim 1 wherein, said means for providing pulses includes providing pulses at about 60 pulses per second.

5. The apparatus according to claim 1 wherein, said means for providing pulses includes providing pulses at about 120 pulses per second.

6. The apparatus according to claim 1 wherein, said means for providing direct current pulses includes providing pulses at about 60 pulses per second and hot start means for providing about 120 pulses per second fo a controlled time period to said terminal means and reverting to said 60 pulses per second after said time period has elapsed.

7. A welding apparatus powered from a conventional AC source comprising:
  a. rectifier means for converting AC current to standard rectified DC current at a substantially constant potential;
  b. terminal means connected to said rectifier means for connection to welding cables and for delivering rectified DC current at a first current level, said rectified DC current at said first current level constituting a first welding mode;
  c. said terminal means also connected to said rectifier means for connection to welding cables and for delivering rectified DC current at a second current level, said rectified DC current at said second current level constituting a second welding mode;
  d. means for providing direct current pulses at about 60 pulses per second to said terminal means superimposed on said standard rectified DC current of said first current level and constituting a third welding mode;
  e. hot start means for providing about 120 pulses per second at a controlled time period to said terminal means and reverting to about 60 pulses per second after said time period has elapsed, all pulses to said terminal means superimposed on said standard rectified DC current of said first current level, said hot start means constituting a fourth welding mode;
  f. means for providing direct current pulses at about 120 pulses per second to said terminal means superimposed on said standard rectified DC current of said first current level and constituting a fifth welding mode;
  g. means for controlling the width of direct current pulses provided to increase the time between the pulses of at least one of said third, fourth, and fifth modes;
  h. selecting means for selecting one of said first, second, third, fourth, and fifth modes for welding.

8. The welding apparatus according to claim 1 or 7 wherein, the means for controlling the width of direct current pulses includes two silicon controlled rectifiers in a pulse width control circuit with means for triggering at least one of said rectifiers.

9. The welding apparatus according to claim 8 wherein, said pulse width control circuit includes means for maintaining one of said two silicon controlled rectifiers off while the other rectifier is triggered to permit direct current to be pulsed at a rate of 60 pulses per second to said terminal means.

10. The apparatus according to claim 9 wherein the pulse width control circuit includes means for maintaining both silicon controlled rectifiers in a triggered state to provide 120 pulses per second of pulse DC current to said terminal means.

11. The welding apparatus according to claim 10 further comprising a pulse transformer and an auxiliary coil integrated with the pulse transformer to provide a signal source to the pulse width control circuit for providing triggering pulses to said silicon controlled rectifiers.

12. The welding apparatus according to claim 11, wherein said pulse transformer includes two primary coils parallel with one another and two secondary coils in series with one another, said primary coils being connected to two phases of said AC source supplying power to the apparatus.

13. The welding apparatus according to claim 12, wherein said means for triggering at least one of said rectifiers of said pulse width control circuit includes a potentiometer.

* * * * *